United States Patent [19]

Brockman

[11] Patent Number: 5,136,645

[45] Date of Patent: Aug. 4, 1992

[54] BANDWIDTH CONTROLLER FOR PHASE-LOCKED-LOOP

[76] Inventor: Milton H. Brockman, 912 Begonia Ct., Carlsbad, Calif. 92009

[21] Appl. No.: 550,033

[22] Filed: Jul. 9, 1990

Related U.S. Application Data

[62] Division of Ser. No. 74,954, Jul. 17, 1987, Pat. No. 4,956,864.

[51] Int. Cl.[5] .......................... H04B 1/06; H04B 7/02
[52] U.S. Cl. ........................................ 380/34; 375/1; 375/120; 331/18; 331/25; 455/136; 455/266
[58] Field of Search ................... 331/2, 12, 17, 18, 19, 331/25; 455/136–139, 208, 266; 375/97, 120

[56] References Cited

U.S. PATENT DOCUMENTS 4,186,347  1/1980  Brockman et al. ............... 375/97

Primary Examiner—Bernarr E. Gregory
Attorney, Agent, or Firm—James T. English

[57] ABSTRACT

A phase locked loop utilizing digital techniques to control the closed loop bandwidth of the RF carrier phase locked loop in a receiver provides high sensitivity and a wide dynamic range for signal reception. After analog to digital conversion, a digital phase locked loop bandwidth controller provides phase error detection with automatic RF carrier closed loop tracking bandwidth control to accommodate several modes of transmission.

1 Claim, 2 Drawing Sheets

BANDWIDTH CONTROLLER FOR PHASE-LOCKED-LOOP

ORIGIN OF THE INVENTION

This invention was made with Government support under NAS7-918 awarded by NASA. The Government has certain rights in the invention.

REFERENCE TO PRIOR PATENT APPLICATIONS

This patent application is a division of a pending application entitled: RECEIVER FOR COMMUNICATIONS SATELLITE DOWNLINK RECEPTION, Ser. No. 074,954, filed Jul. 17, 1987 by the same inventor, now U.S. Pat. No. 4,956,864.

BRIEF DESCRIPTION OF THE INVENTION

The propagation path at the frequencies of interest for the general field of data communications may vary over a diurnal period due to ionosphere changes and the accumulation of water vapor in the atmosphere. Therefore a receiver having precise control of the bandwidth of the carrier phase locked loop which, in addition to automatic gain control, varies the sensitivity of the receiver over an extended range so that very weak signals as well as very strong signals can be flawlessly received and demodulated, is required.

In accordance with the invention, a controller for such a receiver uses digital techniques to control the phase-locked-loop local oscillator's bandwidth, achieving precise control of the loop bandwidth over a large dynamic range of the received signal.

The controller utilizes the output of a bandpass limiter at the IF output of the main receiver channel. This power limiter amplifier with its center frequency at the IF frequency, provides an output RF carrier signal at IF frequency and an output receiver noise spectrum simultaneously within the bandpass filter bandwidth. The total output power level of the RF carrier signal and receiver noise is constant (a design characteristic of the power limiter) wherein the RF carrier signal power component increases with increasing received signal level while the receiver noise power component decreases. Similarly, the receiver noise power component increases while the RF carrier signal power component decreases with decreasing received signal level. The power limited IF output (RF carrier and receiver noise spectrum) is analog-to-digital (A/D) converted and digitally amplitude detected with an A/D converted in-phase coherent reference frequency to provide an output which is digitally sampled to obtain a digital average value (expected value) over each sampling interval that is a representation of received signal level component as described above. This digital average value controls the time between tracking loop digitally controlled oscillator phase tracking updates by design. As the received signal level increases, the digital average value increases which reduces the time between phase tracking updates which in turn increases the phase locked loop bandwidth. Consequently, the controller operates in the digital domain to maintain precise control of the phase locked loop. This limiter provides an output signal+noise of a constant level wherein the signal component increases with increasing received signal level while the noise component decreases. Similarly the noise increases while the signal decreases with decreasing received signal level. The controller digitally samples the composite signal+noise signal and increases the phase locked loop bandwidth by means of a numerically controlled oscillator and multiplier chain as the received signal level increases, and decreases the phase locked loop bandwidth as the received signal level decreases. The controller operates in the digital domain for precise control of the phase locked loop.

DETAILED DESCRIPTION OF THE PREFERRED EMBODIMENTS

Figure 1:
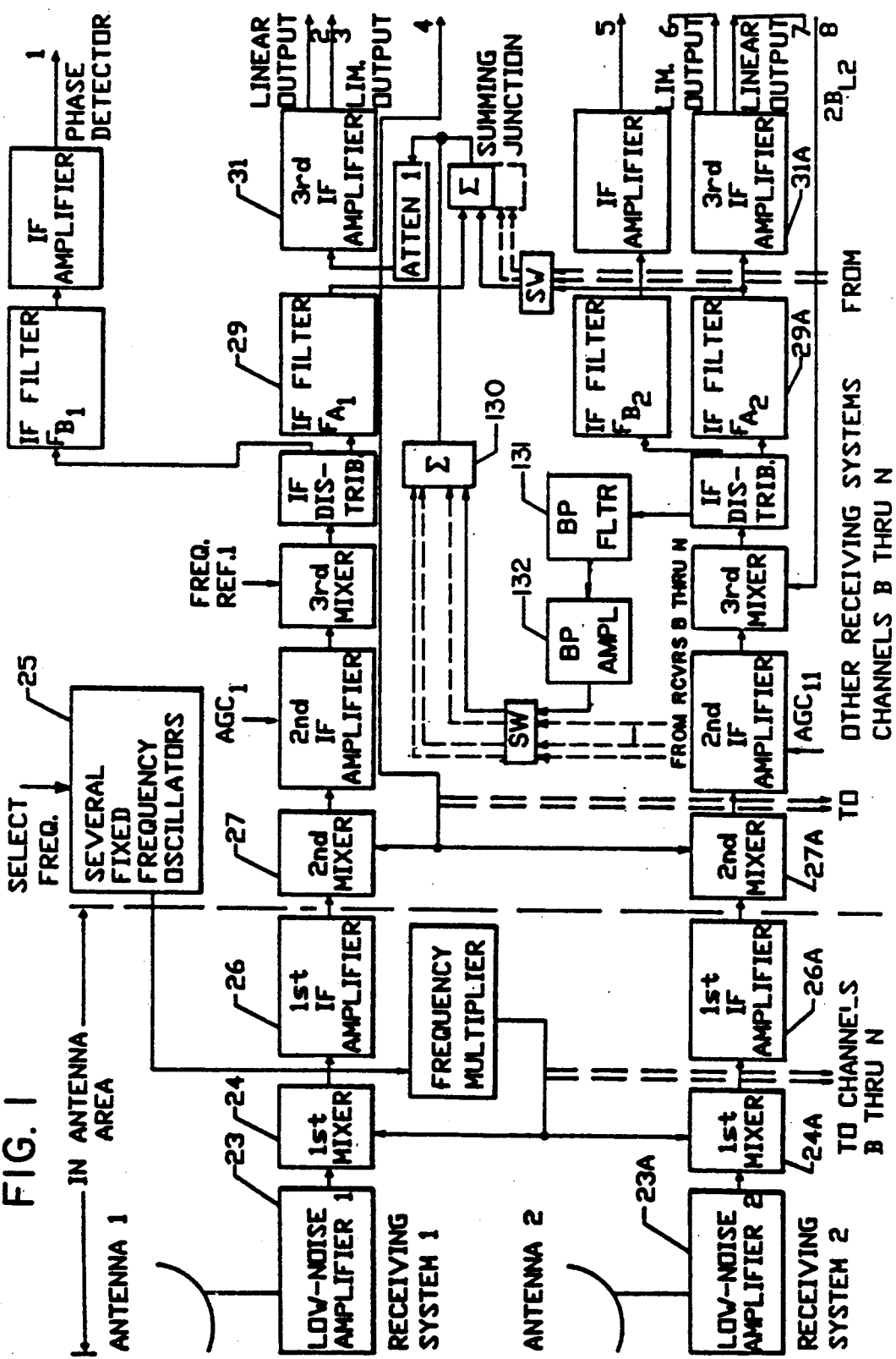
FIG. 1 is a schematic block diagram of the receiver in the prior art showing the essential elements of the receiver including the front end, the receiver channels, the summing methods for the carrier and the modulation spectrums when taken in combination with FIG. 2 which shows the digital controller.
Figure 2:
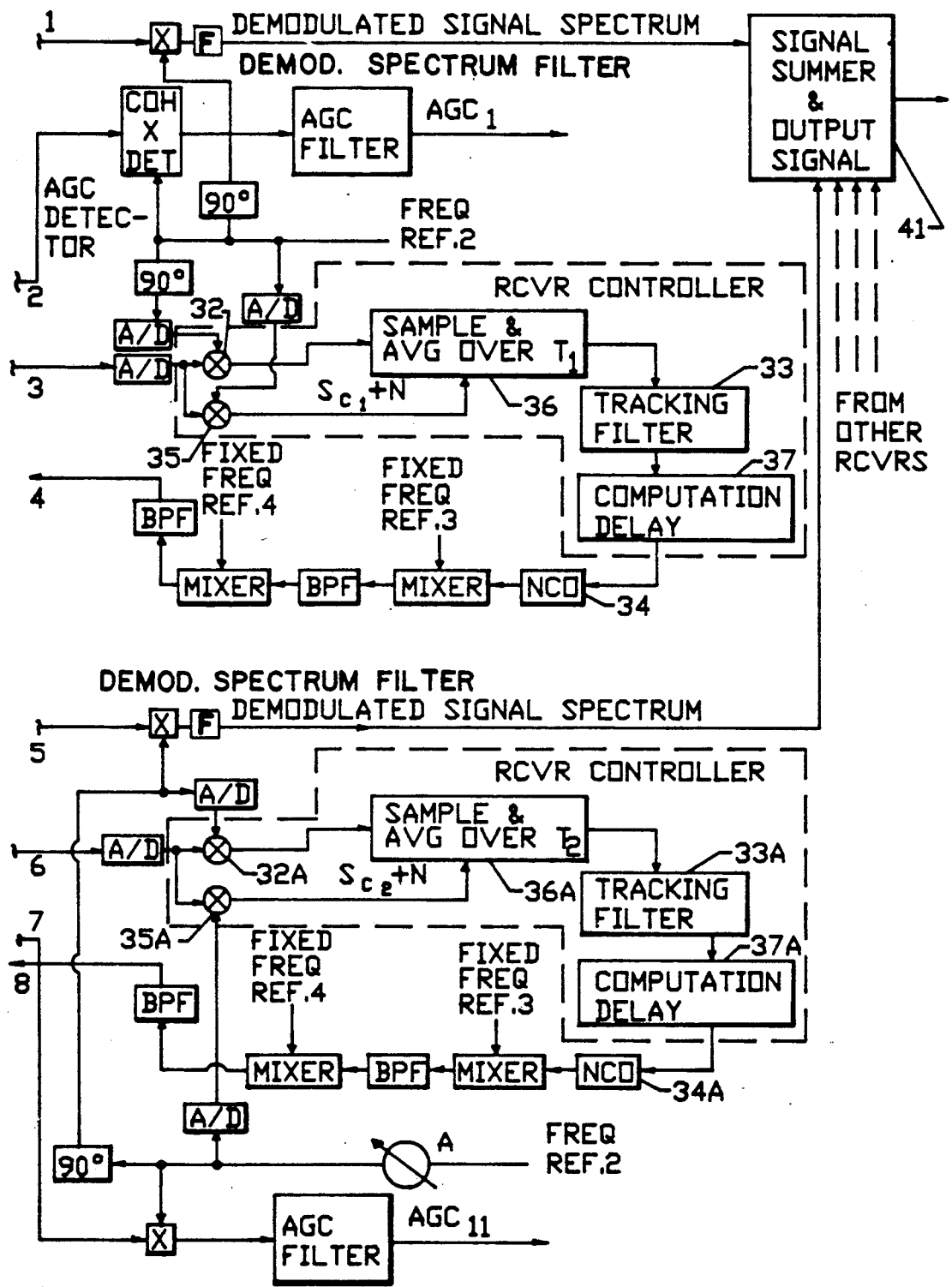
FIG. 2 is a block diagram of the digital controller for controlling the bandwidth of the phase locked loop local oscillator.

Referring to FIG. 1, the bandpass limited output of the summed main receiver third IF amplifier 31 is analog-to-digital (A/D) converted and compared n phase with the quadrature phase of the coherent A/D converted second reference frequency in detector 32, (FIG. 2) sampled every time interval $T_1$ and averaged over each $T_1$ time interval to provide a measure of the phase error in digital form in the phase locked loop for each $T_1$. The time between samples $T_1$ is a function of the receiver signal level. This averaged measure of phase error for each T1 time interval is applied to a software or firmware tracking filter 33 whose output is provided to a computation delay 32. The computation delay provides a transport lag (delay) from the end of the measurement time until the numerically controlled oscillator (NCO) 34 is updated in phase. The NCO includes a digital-to-analog converter which provides a sinusoidal output waveform to a mixer which also has a main receiver fixed reference 3 input. When mixed with main receiver fixed reference frequencies 3 and 4, the NCO with D/A output provides phase lock with the received carrier frequency. The bandpass limited carrier third IF output; i.e., summed coherent RF carrier signal and receiver noise, is constant in level, with the receiver predetection noise component decreasing and the RF carrier component increasing as the received satellite signal level increases. The carrier component $S_{cl}$ and receiver noise, a digital value, which results from digital amplitude detection 35 of the A/D converted power limited output of the main receiver RF carrier third IF amplifier, with the in-phase A/D converted reference frequency 2 for the main receiver phase locked loop. The output of digital amplitude detector 35 is applied to the sample and average over T1 (36) and the average value over each time interval T1 controls the time between samples T1 with T decreasing as the averaged value (carrier component $S_{cl}$) increases. At the design point, the average value of $S_{cl}$ and receiver noise a digital value, provides a specified value $T_1$ which in conjunction with other loop parameters, determines the design point closed loop bandwidth of the main receiver carrier phase locked loop. As the receiver input signal level increases, the average value of $S_{cl}$ and receiver noise increases. This reduces $T_1$ or time between samples which in turn increases the closed loop noise bandwidth of the main receiver carrier phase locked loop.

The N branch receivers utilize similar techniques to provide in each branch receiver a local oscillator controlled by a carrier phase locked loop to the third heterodyne mixer with fixed frequency phase stable references and set to the same frequency as reference frequency 1 in the main receiver to achieve phase lock and track out any differential phase effects. The closed loop bandwidth of the branch receivers are controlled by means similar to the main receiver as shown in branch receiver A (receiving system 2) where the averaged value of carrier signal $S_{c2}$ and receiver noise is applied to the sample and average over T2 (36A) such that the time between samples T2 decreases as averaged value (carrier component $S_{c2}$) increases.

A copy of the application as amended is being forwarded under separate cover.

What is claimed is:

1. A digital phase locked loop band-width controller for a receiver, having a phase locked loop local oscillator connected to a mixer followed by a bandpass limited intermediate frequency amplifier having a carrier and receiver noise output, which comprises:

power limiter means limiting the output of said bandpass limited intermediate frequency amplifier, the limit level being the optimum performance point of the receiver dynamic range, said power limited intermediate frequency amplifier having a narrow band signal and receiver noise output at intermediate frequency;

frequency standard reference signal means coherent with said intermediate frequency amplifier carrier output, providing a frequency standard first reference signal output, and including means for phase shifting the output of said reference signal means 90 degrees with respect to said power limited intermediate frequency amplifier output carrier signal producing an orthogonal second reference signal output, and including analog-to-digital converter means converting said first and said second outputs of said reference signal means from analog to first and second digital outputs;

analog-to-digital converter means converting the power limited output of the intermediate frequency amplifier from analog to digital values which includes the sinusoidal time varying phase of the received sinusoidal carrier signal;

a first correlator having a digital value output including a + or − sign bit which represents the phase error relative to 90 degrees, between the power limited intermediate frequency amplifier output carrier signal and receiver noise and the orthogonal frequency standard signal;

a second correlator having a digital value output which represents the correlation between the power limited intermediate amplifier output carrier signal and receiver noise and the in-phase first output of said frequency standard reference signal means;

sampling and averaging means sampling received signal carrier level and establishing a sample time interval inversely proportional to signal carrier level, connected to said second correlator, said sampling and averaging means including a first digital averaging means receiving digital values from said second correlator, averaging digital values over each said sample time interval and producing an average value representative of received signal carrier level for controlling the sample time interval, reducing the interval as received signal level increases;

a second digital averaging means receiving digital values from said first correlator, over each time interval, and producing the averaged phase error as a digital output with a + or a − signal bit as a digital output for each sample time period;

a tracking filter connected to said sampling and averaging means output, establishing the response time of the loop, said filter having an output;

receiver local oscillator means including a numerically controlled oscillator, D/A converter, and multiplier chain, changing the phase of said local oscillator and bandwidth of said receiver, connected to said mixer, in accordance with the phase error averaged over each sampling interval; and delay means receiving said tracking filter output, for controlling the time when the phase error averaged over each sampling interval is applied to said numerically controlled oscillator, in said local oscillator means, connected to said numerically controlled oscillator.

* * * * *